July 23, 1963 H. C. WESTCOTT 3,098,761

MAGNETIC RECORDING ELEMENT CONTAINING DIAMAGNETIC MATERIAL

Filed April 15, 1959 3 Sheets-Sheet 1

INVENTOR.
Horace C. Westcott
BY
Synnestvedt & Lechner
ATTORNEYS

July 23, 1963 H. C. WESTCOTT 3,098,761

MAGNETIC RECORDING ELEMENT CONTAINING DIAMAGNETIC MATERIAL

Filed April 15, 1959 3 Sheets-Sheet 2

INVENTOR.
Horace C. Westcott
BY
Synnestvedt & Lechner
ATTORNEYS

July 23, 1963 H. C. WESTCOTT 3,098,761

MAGNETIC RECORDING ELEMENT CONTAINING DIAMAGNETIC MATERIAL

Filed April 15, 1959 3 Sheets-Sheet 3

INVENTOR.
Horace C. Westcott
BY
Synnestvedt & Lechner
ATTORNEYS

United States Patent Office 3,098,761

Patented July 23, 1963

3,098,761

MAGNETIC RECORDING ELEMENT CONTAINING DIAMAGNETIC MATERIAL

Horace Clifford Westcott, 917 Drexel Lane, Bryn Mawr, Pa.

Filed Apr. 15, 1959, Ser. No. 806,698
13 Claims. (Cl. 117—145)

This invention relates to improved magnetic recording elements, comprising a magnetic iron oxide dispersed in a binder system, in which the magnetic permeability of the iron oxide and the negative permeability of the binder system is adjusted to a desired ratio by the addition of diamagnetic substances, in order that a more uniform signal level may be obtained over a wide band of frequencies, and, at the same time, a high absolute signal level be realized. This application is a continuation-in-part of my application Serial No. 677,785, filed August 12, 1957, now abandoned.

The improved magnetic recording elements of my invention will be explained below in connection with the accompanying drawings in which—

Figure 1:
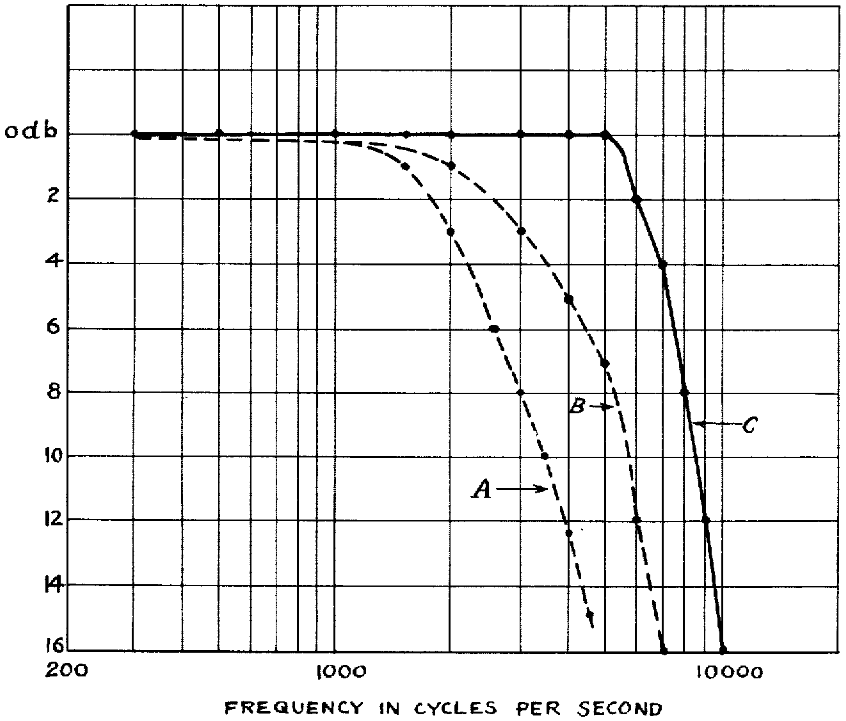
FIGURE 1 is a plot comparing the performance of recording elements of the invention with a control sample.

Magnetic recording surfaces, such as tapes, discs, cylinders, and other suitable recording surfaces, comprise a magnetic iron oxide dispersed in a resinous binder, to which have been added plasticisers, curing agents, lubricants, and such other materials as may be desirable to produce desirable physical properties in the recording media.

These desirable properties also include the following magnetic properties: (1) high absolute signal level, (2) high signal-to-noise ratio, (3) low distortion of the signal, and (4) a wide band of frequencies over which the signal may be recorded with substantially equal intensity, it being understood that, within certain limits, the frequencies so recorded may be equalized by the use of electronic circuitry.

High absolute signal level requires that the highest possible ratio between the magnetic iron oxide and the binder system be realized, and it has been shown to be desirable to employ a type of magnetic iron oxide which is magnetically anisotropic, and which may therefore be caused to become oriented into the preferred direction of magnetization during the application of the oxide/binder combination to the base material, in the case of surface coatings, or during the molding or forming operation in other cases.

This orientation of the magnetic particle gives rise to the well-known "square loop" effect, in which the remanent induction ($Br$) approaches the saturated induction ($Bs$) as closely as possible, and may, in some cases, reach as high as 90% of the saturated induction. It may then be said that 90% of the magnetic iron oxide in the system in being used to retain the recorded signal.

Magnetic iron oxide is usually defined by the intrinsic coercivity, particle size and shape, although other physical definitions may be added, such as oil absorption.

Early forms of magnetic iron oxide used for magnetic recording had low coercive force, in the range 100 to 150 oersteds, and were not magnetically anisotropic, and thus could not be oriented into the preferred direction of magnetization.

Furthermore, such oxides, when dispersed in conventional binder systems, such as commercially available resins, were found to be incapable of recording a wide range of frequencies at substantially equal intensity unless the linear speed of the recording surface past the recording and reproducing "head" was greater than desired, and it may thus be said that the efficiency of utilization of the recording media was low.

Later forms of magnetic iron oxide had magnetic coercivities in the range 200 to 500 oersteds, and were magnetically anisotropic in some cases, so that a higher ($Br$):($Bs$) ratio could be achieved. However, the physical properties of the acicular forms of these higher coercive force materials was not satisfactory for the incorporation of the oxide into the binder system to the preferred degree, so that it was not possible to realize a high absolute signal level. However, the range of frequencies over which the signal could be recorded with substantially equal intensity was satisfactory at the linear speeds desired, but at the expense of high absolute signal level, and at higher coercive force, which reduces the efficiency of the overall recording system, and in extreme cases causes difficulty in the erasure of the recorded signal.

In my co-pending applications Nos. 533,863, filed September 12, 1955, now abandoned, and 578,735, filed April 17, 1956, now U.S. Patent No. 2,954,303, I described more desirable forms of magnetic iron oxide, with lower magnetic coercivity, and improved physical properties to allow for incorporation into a binder to the preferred extent.

My present invention can be used with either of the forms of magnetic iron oxide described above, and preferably with the form of magnetic iron oxide described in my co-pending applications, when the efficiency of utilization of the recording medium will be greatest.

I have discovered that the higher magnetic coercivity oxides, with the resulting low magnetic permeability provide satisfactory frequency ranges over which the signal may be recorded with substantially equal intensity because the ratio of oxide permeability to negative permeability in the binder system is reasonably satisfactory, but that a much improved frequency response may be obtained by the addition of highly diamagnetic materials to the binder system, and that it is possible to control the frequency range by adjusting the ratio of oxide permeability to negative permeability of the binder.

I have further found that the lower magnetic coercivity oxides which, because of their higher permeability are not matched by the relatively small negative permeability of conventional binder materials, can, when highly diamagnetic substances are added to the binder, not only be made to equal high coercivity materials, but can be made to far surpass them.

Hitherto, the function of the binder has been associated with the physical properties desired, namely, good abrasion resistance, good film strength, and freedom from "shedding" and from film distortion.

I have found that there are other properties in the binder which are important in achieving the desired recording characteristics, and that the oxide alone cannot be regarded as the sole criterion for determining the frequency response of the system. However, commercially available binders do not exhibit these properties to the desired extent, and the negative susceptibility, or negative permeability of the binder must be adjusted to the magnetic permeability of the magnetic oxide employed in such binders.

My invention, therefore, relates to the use of highly diamagnetic materials which may be added to conventional binders so that the negative susceptibility of the binder is correct for the magnetic permeability of the oxide employed in such binders.

Figure 4:
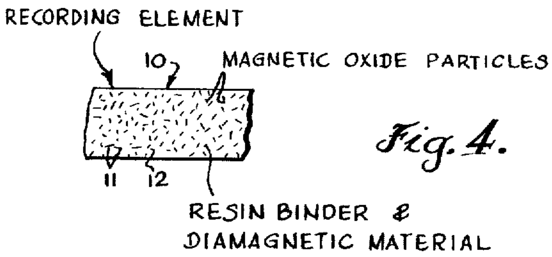
FIGURE 4 is a very diagrammatic plan view of a magnetic recording element in the form of a tape constructed according to the invention.

At this point reference to the diagrammatic view of FIGURE 4 may assist in the understanding of the invention. In that figure, a recording element in tape form is generally designated as 10. Particles of magnetic iron oxide are dispersed throughout the recording element as indicated at 11. These particles are, of course, very small and in the diagrammatic illustration of FIGURE 4, for purposes of clarity, they are shown much enlarged with respect to the remainder of the recording element. The magnetic iron oxide particles 11 are dispersed in and separated by a resinous binder 12, which also contains, as explained herein, certain highly diamagnetic materials.

My improved magnetic recording element comprises a combination of magnetic iron oxide with magnetic permeability in the correct ratio to the negative permeability of the binder system for the frequency response desired, it being understood that the lower the magnetic coercivity, the higher the permeability of the oxide, and the higher the required negative permeability in the associated binder system.

Thus for high absolute signal level, I prefer to use a type of iron oxide which has the correct physical properties for incorporation in the binder to the greatest possible extent, but such oxides exhibit magnetic permeabilities which, when used with conventional binder systems, such as commercially available resins, do not produce the correct ratio between oxide permeability and negative binder permeability for the range of frequencies over which the signal may be recorded with substantially equal intensity.

Diamagnetism as a phenomenon has in the past been recognized as little more than a scientific curiosity, probably because the absolute value of the negative susceptibility of diamagnetic materials is so much smaller than the absolute value of the positive susceptibility of ferromagnetic materials such as iron. I have discovered, however, that the negative susceptibility of known diamagnetic substances, such as bismuth, antimony and the like have absolute values which are of the same or nearly the same order of magnitude as the effective positive mass susceptibility of the magnetic oxides used in magnetic recording media.

I have discovered that as a consequence of this relationship, it is possible to dramatically affect the magnetic properties of magnetic recording media by incorporating in the binder thereof sufficient quantities of diamagnetic substances to substantially alter the negative susceptibility of the basic binder material itself.

Typical commercial binders have been found to exhibit negative mass susceptibility, expressed in c.g.s. electromagnetic units, of the order $-0.5\times10^{-6}$ c.g.s. units, requiring the use of oxides with undesirably high magnetic coercivity (or low permeability) and such oxides also have undesirable physical properties, namely, high oil absorption, which limit the amount which may be incorporated in such binders and still maintain good film strength and good abrasion resistance.

I therefore incorporate in my binder system the required amount of highly diamagnetic substance of which the negative susceptibility is greater than the negative susceptibility of the binder itself, and the degree to which I incorporate such materials depends upon the permeability (or coercivity) of the oxide, the ratio of the oxide to binder, and the extent to which the magnetically anisotropic oxide has been oriented into the preferred direction of magnetization.

By selecting the diamagnetic substance in order to provide the correct ratio between oxide permeability and binder susceptibility, I also control the permeability of the oxide/binder combination, which will determine the magnetic flux resulting from the supersonic bias applied to the recording element at the time of recording. It is desirable, therefore, in those recording systems in which the bias current is fixed, and not readily adjusted, to provide and oxide/binder permeability ratio such that the resulting bias flux provides the optimum frequency response and distortion characteristics for the recording system in question.

My invention therefore enables me to select iron oxides over a wide range of magnetic coercivities (with a resulting wide range in magnetic permeabilities) and combine such oxides with commercially available resins with the desirable physical properties, to which I add diamagnetic materials which will produce negative permeabilities in the binder system so that the correct ratio between oxide permeability and binder susceptibility is maintained for the frequency range over which it is desired to record frequencies with substantially equal intensity.

Heretofore the relationship between positive and negative susceptibility of the oxide and binder components of the magnetic recording medium was not recognized and the art has, in ignorance of this factor, empirically selected the kind of oxides which work best with conventional binder materials. This means, in effect, that the art has concentrated its attention upon those magnetic oxides whose positive magnetic susceptibility "matches" the negative susceptibility of conventional binder materials.

The discovery that the "matching" of the permeability of the binder and oxide can also be accomplished by manipulation of the binder member of the combination makes it possible to use oxides whose coercivity (or permeability) falls far short of the criteria heretofore thought to be applicable, but which in other respects have properties far excelling those of the now conventional high coercivity materials. For example, I have found that it is possible to use magnetic particles which are much smaller in their greatest dimension than those now popularly used, with the result that I am enabled to obtain a much higher degree of resolution than is obtained in other magnetic recording media. I am enabled to use such materials because I have found that their high positive magnetic susceptibility may be matched by binders having high effective negative magnetic susceptibility, due to the incorporation therein of highly diamagnetic substances.

Examples of such high permeability, low coercivity oxides are to be found in my co-pending applications above referred to, in which there are disclosed magnetic oxides in the form of particles approximately one-third to one-half the size of the acicular particles of the oxides conventionally used in magnetic recording media.

While I do not fully understand the mechanism by which the "matching" of the positive and negative susceptibilities of the oxide and binder components of my magnetic recording media operates, the facts which I have found empirically conform with the hypothesis that the external magnetic flux lines of a discrete magnetized particle in a magnetic recording medium pass in substantial measure through an adjacent particle, and that this effect is undesirable. Furthermore, according to my hypothesis, the smaller the magnetized particles are, the shorter is the external flux path from one pole to the other. Finally, the more highly permeable the adjacent particle is, the greater will be the flux concentration therein.

If we visualize a magnetic recording medium as comprising a series of magnetized particles, each located at the center of a "box" of binder material, it will be seen that the external flux lines of a given particle, in order to pass through an adjacent particle, also pass through substantial amounts of binder material, and it will at once be apparent that if the permeability of the binder material be reduced, a corresponding increase in the permeability of the adjacent particle can be tolerated.

Whether or not this hypothesis is correct, I have found it to be a convenient tool in visualizing the mechanism of my invention, and I regard it as being confirmed by the fact that an increase in the absolute value of the negative permeability of the binder material, obtained by adding a relatively highly diamagnetic substance thereto, can be used in a manner to overcome the disadvantageous consequences of an increase in the permeability of the magnetic oxide particles. The hypothesis above set forth suggests that it is volume susceptibility of a diamagnetic substance rather than its mass or specific susceptibility which should be of interest in this connection, and I have discovered that this is indeed the case.

The published values of negative susceptibility for the elements are generally given in terms of specific susceptibility; such values can be converted to volume susceptibility by multiplying the specific susceptibility value by the specific gravity. Inspection of the values of negative volume susceptibility for common substances reveals that bismuth is an outstanding example thereof, and that antimony, mercury, zinc and beryllium also possess negative volume susceptibility to a substantial extent; my investigation of other diamagnetic substances has established that the beneficial combination of each such substance is a function of its negative magnetic susceptibility.

I have found that bismuth, antimony and mercury are most useful in my invention, and that bismuth is to be preferred, both because it has the highest negative susceptibility of all, and also because some of its compounds have other properties which peculiarly adapt them to incorporation in magnetic recording media.

While it is possible to incorporate metallic bismuth, antimony, mercury, etc. in magnetic recording media and thereby gain the advantages of the invention, I prefer to use these elements in the form of inorganic compounds or organo-metallic compounds, and desirably in the form of organo-metallic compounds which both contain a large amount of diamagnetic metal and also have other properties which render such compounds compatible with the other constituents of the magnetic recording medium.

The highest percentage of bismuth, for example, is found in methylbismuthine $CH_3BiH_2$. This, however, is a liquid, and to some extent volatile, and thus inconvenient to use for this purpose. Triphenyl bismuth contains, by actual measurement of a commercially available material, 46% bismuth; and this is my preferred material. I have also used bismuth stearate, bismuth iodide, chloride and fluoride, bismuth trivinyl, bismuth tributyl, bismuth naphthenate, and bismuth octoate.

I have used antimony in the form of antimony stearate, antimony napthenate, antimony octoate, triethyl antimony, trivinyl antimony, trimethyl antimony, triphenyl antimony, and triphenyl antimony distearate; the halides may also be used. Of all the antimony compounds, triphenyl antimony di-stearate and triphenyl antimony are the most suitable, in that order. In general any form of antimony is much inferior to the corresponding form of bismuth, both because of the lower negative susceptibility of antimony and also because of organo-metallic compounds of antimony generally contain less antimony metal than the corresponding bismuth compound.

I have used mercury in the form of metallic mercury, mercuric iodide and methylmercuric iodide. The metallic mercury was incorporated by milling a mixture of oxide and liquid mercury.

While certain beryllium compounds are magnetically suitable, they are unatractive because of their toxicity.

The examples which follow herebelow illustrate the effect on the performance of a magnetic recording tape of incorporating therein diamagnetic substances.

Example "A," the control example, sets forth the ingredients used in preparing a magnetic oxide coating embodying 75% of magnetic iron oxide and 25% of film-forming ingredients by weight. The remaining examples set forth various modifications of the control example in which diamagnetic materials were added without altering the relationship between the magnetic oxide constituent and the film-forming ingredients, including the diamagnetic additives of my invention as a constituent of the later.

*Example A*

| | Parts |
|---|---|
| Iron oxide (250 oersteds) $Fe_2O_3$ | 75 |
| Vinyl resin [1] | 16.76 |
| Plasticiser | 8.24 |

[1] Polyvinyl chloride-polyvinyl acetate co-polymer.

*Example B*

| | Parts |
|---|---|
| Iron oxide (250 oersteds) $Fe_2O_3$ | 75 |
| Vinyl resin [1] | 7.5 |
| Plasticiser | 7.5 |
| Bismuth stearate | 2.5 |

[1] Polyvinyl chloride-polyvinyl acetate co-polymer.

*Example C*

| | Parts |
|---|---|
| Iron oxide (250 oersteds) $Fe_2O_3$ | 75 |
| Vinyl resin [1] | 12.24 |
| Plasticiser | 5.26 |
| Bismuth stearate | 2.5 |
| Bismuth triphenyl | 5.0 |

[1] Polyvinyl chloride-polyvinyl acetate co-polymer.

*Example D*

| | Parts |
|---|---|
| Iron oxide (250 oersteds) $Fe_2O_3$ | 75 |
| Hypalon resin [1] | 12 |
| Plasticiser | 3 |
| Bismuth triphenyl | 10 |

[1] Chlorosulphonated polyethylene.

*Example E*

| | Parts |
|---|---|
| Magnetic iron oxide, $Fe_2O_3.FeO$ (275 oersteds) | 80 |
| Hypalon resin [1] | 14 |
| Bismuth triphenyl | 6 |

[1] Chlorosulphonated polyethylene.

Each of the compounds of Examples A, B, and C was coated on an acetate base material, subjected to an orienting field while the binder was in fluid condition, and then finished in accordance with conventional techniques.

While the orienting operation was in general conducted along conventional lines, I have found that the field intensity required to effect orientation is much lower when the binder contains diamagnetic materials, for example, the field required to achieve orientation of the oxide particles in the tape of Example C was about one-fifth of that required to orient the particles in the tape of Example A.

The resulting tapes were tested by recording a test signal thereon with an Ampex Model 351 recorder, operated at 3¾" per second. The bias and equalization circuits had been optimized for conventional commercial recording tapes.

The signals obtained upon play-back are recorded in FIGURE 1. It will be noted that the response of the control tape of Example A had been reduced by 6 db from the 1000 cycle level at a frequency of about 2500 cycles, whereas the response of the tape produced in accordance with Example C was down 6 db at a point well above 7000 cycles.

Figure 2:
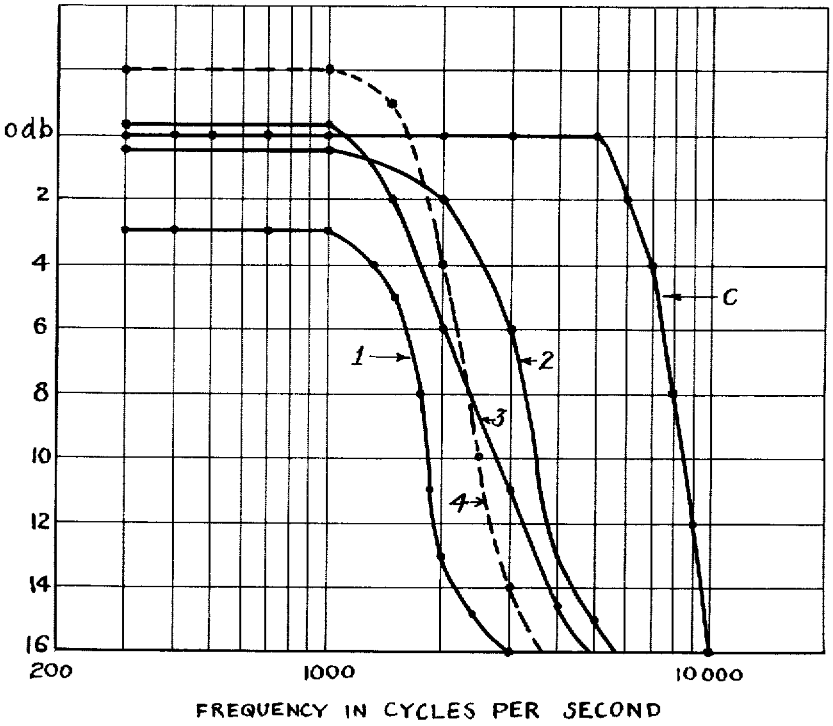
FIGURE 2 is a similar plot comparing the performance of a recording element of the invention with several high quality commercially available recording elements.

In FIGURE 2, I have plotted the performance of the tape of Example C against the performance of four of the best available commercial magnetic recording tapes, of which tape 1 is a tape well known for its low print-through characteristics; tape 2 is a sample of a professional type tape produced by a well known tape manufacturer; tape 3 was a similar tape produced by a second well known manufacturer; and tape 4 was a high out-put tape produced by the manufacturer of tape 3.

It should be noted that the adjustments of the equipment had been optimized for tapes of the kind represented by tapes 2 and 3.

Figure 3:
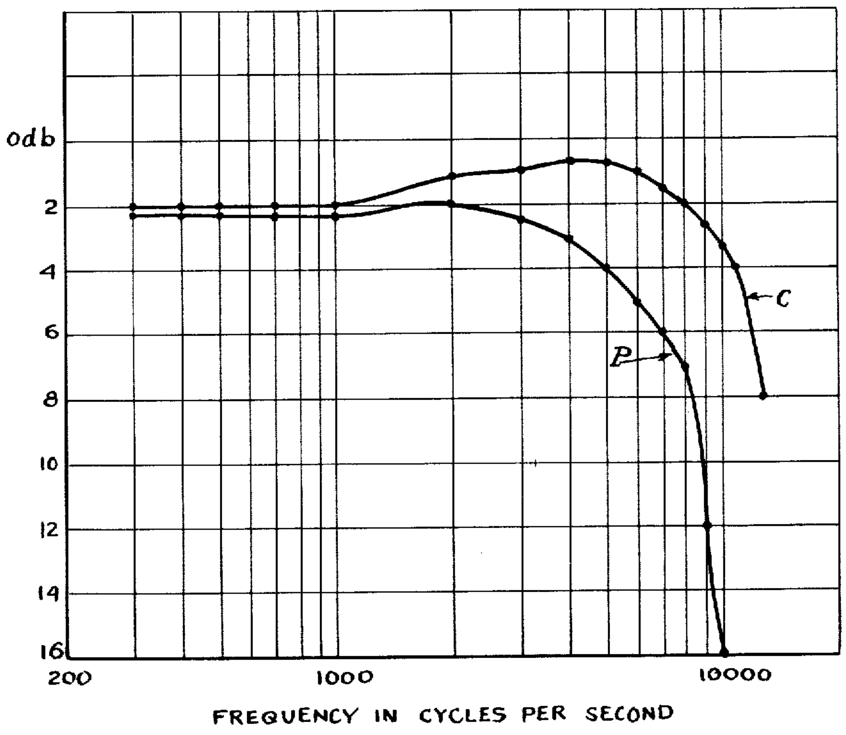
FIGURE 3 is a plot similar to FIGURE 1 comparing the performance of a recording element of the invention with a high quality commercially available recording element under somewhat different recording conditions than those of the preceding two figures.

FIGURE 3 records the results obtained when the tape of Example C was compared with a professional recording tape on the same equipment, but operated at 7½" per second.

It will be noted that the amount of plasticiser used in Examples B and C is smaller than in Example A. This is because I have found that bismuth stearate is an excellent plasticiser.

Results similar to those obtained in Examples B and C were obtained when resins other than vinyl resins were used as the principal film-forming constituent. For example, the results obtained with Example D were comparable to those obtained with the formula of Example C.

When antimony triphenyl and antimony stearate were substituted for the corresponding bismuth compounds of Examples B, C, and D, the results obtained were not as good as those illustrated by the B and C curves of FIGURE 1, but were still substantially better than the results illustrated by curve A of FIGURE 1.

In general, as indicated above, I prefer to use bismuth compounds rather than those of antimony, both because it is possible to use smaller quantities of bismuth due to its higher negative susceptibility and also because it is more compatible with the other film-forming ingredients. In particular, the organic bismuth compounds contribute a degree of lubricity and considerable additional hardness to the film.

Since my invention makes possible the use of smaller and more regularly shaped oxide particles than the acicular oxides of the art, advantage may be taken of other properties of such oxides. One of these lies in the fact that the reduced surface area—as measured by lower oil absorption—permits a higher ratio of oxide to binder to be used, with a corresponding increase in absolute signal level. A formulation exploiting that feature is set out in Example E; a tape made from this formulation yielded about 1.5 db greater signal level than a control tape in which the oxide content was 75% and all other characteristics were the same. No deterioration in any property attributable to the higher oxide loading could be found.

The optimum quantities of diamagnetic materials required in a given formulation depend upon the properties of the oxide and binder resin employed. Oxides with coercivities ranging from about 100 to 500 may be used. When the coercivity of the oxide is lower than the 250 oersteds of the examples given above (and the positive permeability of the oxide is higher) I find that, for equivalent performance, more diamagnetic material should be incorporated; when the negative permeability of the binder resin is higher than that of the binder of the examples, less diamagnetic materials is needed. In any case, the significant quantities are the percentage of diamagnetic metal in the binder as a whole (regardless of the compound by means of which the metal is introduced) and the negative permeability of the metal in question.

Significant increases in performance are noted when bismuth content of the binder is as low as .3% by weight, when the coercivity of the oxide is above 275 and the binder is vinyl; as much as 6% to 8% bismuth may be required to give optimum results with oxide whose coercivity is as low as 150 and with a vinyl binder; somewhat less bismuth is needed when the binder is Hypalon, with all values of oxide coercivity. Much higher percentages of antimony are required to give the same results, about twice as much antimony being required, example for example; and as much as five times as much mercury may be required.

I claim:

1. A magnetic recording element comprising particles of a ferromagnetic oxide dispersed in and separated by a resinous binder in which binder is incorporated from about .3% to about 15% by weight, calculated as pure metal, of a diamagnetic material having negative permeability greater than the negative permeability of the resin of the binder.

2. A magnetic recording element in accordance with claim 1 in which the oxide is present in an amount by weight equal to from 1 to 6 times the amount of binder.

3. A magnetic recording element in accordance with claim 2 in which the ferromagnetic oxide has a coercivity between 100 and 500 oersteds.

4. A magnetic element in accordance with claim 3 in which the binder consists substantially of a vinyl resin.

5. A magnetic element in accordance with claim 3 in which the binder consists substantially of chlorosulphonated polyethylene resin.

6. A magnetic recording element comprising particles of $Fe_2O_3$ having a magnetic coercivity between 100 and 500 oersteds, dispersed in and separated by a binder system comprising a synthetic resin, said binder system further comprising a diamagnetic substance selected from the class consisting of diamagnetic metals having volume susceptibilities greater than $-2\times10^{-6}$ c.g.s. units and compounds thereof, said substance being present in an amount equal to from about .3% to about 15% of the binder system calculated as pure metal.

7. A magnetic recording element comprising particles of a ferromagnetic oxide having a coercivity of between 100 and 300 oersteds, dispersed in and separated by a binder system comprising a synthetic resin having a specific magnetic volume susceptibility not greater than $-1\times10^{-6}$ c.g.s. units said binder system further comprising a diamagnetic substance selected from the class consisting of bismuth, antimony, mercury and compounds thereof, said substance being present in an amount equal to from .3% to 15%, calculated as pure metal, of the weight of the binder system.

8. A magnetic recording element in accordance with claim 7 in which the diamagnetic substance is triphenyl bismuth.

9. A magnetic recording element in accordance with claim 7 in which the diamagnetic substance is bismuth stearate.

10. A magnetic recording element in accordance with claim 7 in which the diamagnetic substance is triphenyl antimony distearate.

11. A magnetic recording element in accordance with claim 7 in which the diamagnetic substance is triphenyl antimony.

12. A magnetic recording element comprising iron oxide $Fe_2O_3$ having a coercivity of 250 oersteds, 75 parts, a binder comprising about 12 parts of a co-polymer of polyvinyl chloride and polyvinyl acetate, about five parts plasticiser, about 2½ parts bismuth stearate, and about 5 parts bismuth triphenyl, said ingredients being coated on a cellulose acetate base and the particles of iron oxide being magnetically oriented in a manner to bring their magnetic axes into parallelism.

13. A magnetic recording element comprising particles of a ferromagnetic oxide dispersed in and separated by a resinous binder in which binder is incorporated a diamagnetic material selected from the class consisting of bismuth and compounds thereof, in an amount from about .3% to about 8% of the binder, calculated as pure metal.

References Cited in the file of this patent

UNITED STATES PATENTS

| | | |
|---|---|---|
| 2,268,782 | Stier | Jan. 6, 1942 |
| 2,576,456 | Harvey et al. | Nov. 27, 1951 |
| 2,607,710 | Schmelzle | Aug. 19, 1952 |
| 2,796,359 | Speed | June 18, 1957 |
| 2,799,609 | Dalton | July 16, 1957 |
| 2,900,344 | Stuyts et al. | Aug. 18, 1959 |
| 2,923,683 | Ingraham et al. | Feb. 2, 1960 |
| 2,954,303 | Westcott | Sept. 27, 1960 |

FOREIGN PATENTS

| | | |
|---|---|---|
| 688,769 | Great Britain | Mar. 11, 1953 |

OTHER REFERENCES

Bozorth, Ferromagnetism, pages 456–458, D. Van Nostrand Co., Inc.

UNITED STATES PATENT OFFICE
CERTIFICATE OF CORRECTION

Patent No. 3,098,761 July 23, 1963

Horace Clifford Westcott

It is hereby certified that error appears in the above numbered patent requiring correction and that the said Letters Patent should read as corrected below.

Column 2, line 4, for "in" read -- is --; column 4, line 22, for "and" read -- an --; column 6, line 22, for "later" read -- latter --; line 33, for "7.5" read -- 15 --.

Signed and sealed this 31st day of March 1964.

(SEAL)
Attest:
ERNEST W. SWIDER

Attesting Officer

EDWARD J. BRENNER

Commissioner of Patents